US009718546B2

(12) United States Patent
Bohlen et al.

(10) Patent No.: US 9,718,546 B2
(45) Date of Patent: Aug. 1, 2017

(54) SYSTEM AND METHOD FOR DEPLOYING LOADS OUT OF AN AIRCRAFT (71) Applicants: Airbus Operations GmbH, Hamburg (DE); Airbus SAS, Blagnac (FR)

(72) Inventors: Carsten Bohlen, Cornebarrieu (FR); Holger Bohlen, Delmenhorst (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 815 days.

(21) Appl. No.: 13/891,290

(22) Filed: May 10, 2013

(65) Prior Publication Data
US 2014/0084111 A1 Mar. 27, 2014

Related U.S. Application Data (63) Continuation of application No. PCT/EP2011/069802, filed on Nov. 10, 2011.
(Continued)

(30) Foreign Application Priority Data

Nov. 10, 2010 (DE) .......................... 10 2010 050 896

(51) Int. Cl.
B64D 1/12 (2006.01)
B64D 1/10 (2006.01)
(Continued)

(52) U.S. Cl.
CPC ............... B64D 1/12 (2013.01); B64D 1/10 (2013.01); B64D 17/38 (2013.01); B64D 17/62 (2013.01);
(Continued)

(58) Field of Classification Search
CPC . B64D 1/10; B64D 1/12; B64D 17/22; B64D 17/74
See application file for complete search history.

(56) References Cited

U.S. PATENT DOCUMENTS 3,724,788 A 4/1973 Petry et al.
3,801,051 A 4/1974 Hosterman et al.
(Continued)

FOREIGN PATENT DOCUMENTS

CA 2309523 A1 12/2000
CN 201534615 U 7/2010
(Continued)

OTHER PUBLICATIONS

International Searching Authority, International Search Report for International Application No. PCT/EP2011/069802 dated May 21, 2011.
(Continued)

Primary Examiner — Katherine Mitchell
Assistant Examiner — Catherine A Kelly
(74) Attorney, Agent, or Firm — Lorenz & Kopf, LLP (57) ABSTRACT A system for deploying loads out of an aircraft comprises an aerial delivery parachute with an aerial-delivery parachute line and an activation means for placing the aerial delivery parachute in an enveloping flow past the aircraft. Within the aircraft a receiving device can be positioned that receives a tractive force acting on the aerial-delivery parachute line, which tractive force has been determined by a force measuring device and has been transmitted by way of a transmitting device. With the knowledge of the tractive force it is possible both to implement emergency release and to assess whether an aerial delivery parachute has correctly deployed in the flow enveloping the aircraft.

20 Claims, 4 Drawing Sheets

Related U.S. Application Data (60) Provisional application No. 61/412,121, filed on Nov. 10, 2010.

(51) Int. Cl.
    *B64D 17/38* (2006.01)
    *B64D 17/62* (2006.01)
    *B64D 17/68* (2006.01)
    *B64D 17/74* (2006.01)
    *B64D 45/00* (2006.01)

(52) U.S. Cl.
    CPC .......... *B64D 17/68* (2013.01); *B64D 17/74* (2013.01); *B64D 2045/0085* (2013.01)

(56) References Cited

U.S. PATENT DOCUMENTS

| | | | | |
|---|---|---|---|---|
| 4,779,824 | A | 10/1988 | Leger | |
| 5,697,581 | A * | 12/1997 | Conroy | B64D 1/12 24/136 A |
| 5,816,535 | A * | 10/1998 | Underwood, Jr. | B64D 1/12 244/137.3 |
| 6,070,832 | A * | 6/2000 | Redd | G01S 15/42 14/71.1 |
| 6,241,190 | B1 * | 6/2001 | Lunsford | B64D 1/12 244/137.3 |
| 6,299,104 | B1 * | 10/2001 | El-Sherif | B64D 21/00 244/137.3 |
| 6,789,766 | B2 * | 9/2004 | Horst | B64D 1/08 244/137.3 |
| 6,889,942 | B2 | 5/2005 | Preston | |
| 7,306,188 | B1 * | 12/2007 | Heflin | B64D 17/386 244/149 |
| 7,523,890 | B1 * | 4/2009 | Heflin | B64D 1/10 244/149 |
| 7,584,928 | B2 * | 9/2009 | Hoffmann | B64D 17/74 244/137.3 |
| 7,703,720 | B2 | 4/2010 | Smith | |
| 7,735,781 | B1 * | 6/2010 | Moritz | B64D 1/06 198/371.3 |
| 7,926,764 | B2 * | 4/2011 | Grabmeier | B64D 1/12 244/137.3 |
| 2003/0197094 | A1 * | 10/2003 | Preston | B64D 21/00 244/142 |
| 2009/0127397 | A1 * | 5/2009 | Hyunh | B64D 17/383 244/152 |
| 2009/0189022 | A1 * | 7/2009 | Hoffmann | B64D 17/74 244/152 |

FOREIGN PATENT DOCUMENTS

| | | | | |
|---|---|---|---|---|
| DE | 10303788 | A1 | 11/2003 | |
| DE | 10230535 | B4 | 8/2006 | |
| DE | 102008056783 | A1 * | 5/2010 | B64D 1/10 |
| GB | 2244962 | A | 12/1991 | |

OTHER PUBLICATIONS

German Patent Office, German Office Action dated Oct. 6, 2011 for German Patent Application No. 102010050896.9.
Chinese Patent Office, Chinese Office Action for Application No. 201180054348.3 Dated Dec. 11, 2014.
European Patent Office, European Office Action dated Oct. 23, 2015 for European Patent Application No. 11779685.4.

* cited by examiner

SYSTEM AND METHOD FOR DEPLOYING LOADS OUT OF AN AIRCRAFT

CROSS-REFERENCE TO RELATED APPLICATIONS

This is a continuation of International Application No. PCT/EP2011/069802, filed Nov. 10, 2011, which application claims priority to German Patent Application No. 10 2010 050 896.9, filed Nov. 10, 2010 and to U.S. Provisional Patent Application No. 61/412,121, filed Nov. 10, 2010, which are all incorporated herein by reference in their entirety.

TECHNICAL FIELD

The technical field relates to a system for deploying loads out of an aircraft, comprising an aerial delivery parachute with an aerial-delivery parachute line and an activation means for placing the aerial delivery parachute in an enveloping flow past the aircraft. The technical field furthermore relates to a method for deploying loads out of an aircraft.

BACKGROUND

Deploying loads out of aircraft by means of aerial delivery parachutes has been known for a long time. There are basically two different methods of moving loads out of an aircraft before these loads descend to the ground. In a first variant the load is pulled out of the aircraft fuselage, by means of an aerial delivery parachute conveyed from an opening flap of the aircraft, into the enveloping flow around the aircraft, and after leaving the aircraft fuselage sinks to the ground in a gravity-driven manner. In a second variant the aircraft fuselage comprises a type of ramp on which the load slides in a gravity-driven manner to an opening situated at the lower end of the ramp, and when the opening is reached falls out of it and during falling activates the aerial delivery parachute. In particular in the first variant, in which an aerial delivery parachute is deployed in an enveloping flow past the aircraft in order to inflate and in so doing pull the load out of the aircraft fuselage, during this process inevitably tractive forces arise between the aerial delivery parachute and the aircraft, which tractive forces impede the flight behavior both as a result of an increase in aerodynamic resistance and pitching moments or yawing moments resulting from this.

A basic design of a system for deploying loads out of an aircraft is described in U.S. Pat. No. 3,801,051. In that publication particular importance is placed on an arrangement comprising an aerial delivery parachute and a drogue parachute, wherein the drogue parachute is used to convey the actual aerial delivery parachute out of the aircraft into the enveloping flow. A so-called "tow plate" is used to guide the arrangement comprising the drogue parachute and the aerial delivery parachute as well as the load.

Furthermore, in DE 102 30 535 B4 a device for deploying loads from an aircraft is shown in which a drogue parachute and a main parachute are used, wherein in this printed publication, in particular, stabilization of the load on the aerial delivery parachute is discussed.

In addition, other objects, desirable features and characteristics will become apparent from the subsequent summary and detailed description, and the appended claims, taken in conjunction with the accompanying drawings and this background.

SUMMARY

The state of the art described above is associated with significant disadvantages. The tractive force that results in the variant of load deployment by pulling the load out by means of an aerial delivery parachute results in slowing the aircraft and in a change in moment management depending on the alignment and position of the tractive force of the aerial delivery parachute. If a load or a tow plate is blocked as a result of an unforeseeable fault, furthermore it is not possible to ensure that the aerial delivery parachute concerned can be manually detached in order to improve the impeded flight characteristics. Likewise, by means of the existing devices and methods it is not possible to determine without doubt that an activated drogue parachute or an aerial delivery parachute is fully activated, and that pulling the load out of the fuselage is possible without further ado.

Accordingly, the present disclosure provides a system for deploying loads out of an aircraft, which system comprises an aerial delivery parachute with an aerial-delivery parachute line and an activation means for placing the aerial delivery parachute in an enveloping flow past the aircraft, in which system it is possible to detect both an error in pulling a load out of the aircraft, and correct placement of the parachute in an enveloping airflow. In addition, the present disclosure also provides such a system in which any negative impact on the flight characteristics of the aircraft during occurring errors can be remedied as quickly as possible and if at all possible without manual intervention.

In one example, the activation means can be implemented by means of a tow plate. The present disclosure is not limited by the type of activation means, but rather all suitable activation means are imaginable that are able to place an aerial delivery parachute in an enveloping flow past the aircraft.

According to one embodiment the system comprises a receiving device for wirelessly receiving signals or data; a first force measuring device that is connected to the aerial-delivery parachute line for measuring a tractive force acting on the aerial-delivery parachute line in a series connection; and a first autarkical voltage supply as well as a wireless first transmitting device that is connected to the first autarkical voltage supply. The first transmitting device is designed to transmit signals and/or data representing acquired measuring data to the receiving device.

The first force measuring device is connected to the aerial-delivery parachute line in such a manner that a tractive force that is produced or taken up by the aerial-delivery parachute line can be acquired by the first force measuring device. The first force measuring device could, for example, be arranged directly on the parachute at a connection point of several lines so as to, on the other end, transmitting tractive force, take up the aerial-delivery parachute line. As an alternative to this the aerial-delivery parachute line could also be subdivided, and the first force measuring device could be attached between the individual parts of the aerial-delivery parachute line. However, in the context of the present disclosure the type or the location of the first force measuring device is unimportant as long as it can be ensured that the tractive force on the aerial-delivery parachute line can reliably be acquired by the first force measuring device.

Furthermore, the design of the first force measuring device is also secondary; it can be designed as a load cell whose measuring principle is based on the elongation of a body with a known spring constant. Apart from conventional spiral springs or helical springs this could also be a metal strip with a wire strain gage bonded thereto, which, however, has no effect on the function of the system according to the present disclosure.

The first transmitting unit is connected to the first force measuring device and is only used to transmit determined force values or corresponding signals. The wirelessly designed first transmitting unit could, for example, be a radio transmitter that is supplied with voltage by the autarkical voltage supply in order to, depending on the incoming signals or data, carry out frequency modulation or amplitude modulation, which signals or data can be received by a correspondingly equipped receiving unit and can be converted back to signals or data. Here again the type and design is immaterial to the functioning of the system according to the present disclosure as long as it can be ensured that with a normal length of the aerial-delivery parachute line transmission of the signals or of the data to the aircraft is possible. Generally, a commercial digital transmitting module operating on a 2.4 GHz or 5 GHz basis can be used; however, far simpler digital or analog transmitting modules that are, for example designed on the basis of a radio modem or similar modules with a low transmitting frequency would also be possible.

The receiving device is a unit that is completely separate from the load, the aerial delivery parachute and the aerial-delivery parachute line to be used on board the aircraft. Said receiving device serves to provide information about the tractive force present at the time without there being a direct electrical connection in the aircraft itself. In this manner information for further processing is known within the aircraft, which information cannot be provided in conventional aircraft or systems for deploying loads. This information makes it possible to obtain an assessment as to whether, for example, an aerial delivery parachute is fully activated and produces a tractive force that corresponds to the parachute area, which tractive force can be determined by means of the first force measuring device. For example, if there is a fault associated with opening the aerial delivery parachute, a situation can be prevented in which the load is released from the aircraft and would possibly fail to arrive on the ground in an undamaged state. Likewise, knowledge about the existing tractive force and its duration can be used for determining whether a released load has become wedged in the interior of the aircraft, and overloading of the system thus becomes obvious so that cutting the aerial delivery parachute or detaching the aerial delivery parachute can reliably be initiated.

By means of the system according to the present disclosure it is thus not necessary to carry out a precise visual and manual check of the procedure of deploying the load because knowledge about this can be obtained practically automatically.

In one embodiment the system for deploying loads additionally comprises a drogue parachute which with the use of the activation means can be placed in the enveloping flow past the aircraft, can be connected to a main parachute, and is designed to pull the still unopened main parachute out of the aircraft, which main parachute then opens outside the aircraft and is responsible for leading out the load to be deployed. The drogue parachute line, on which the drogue parachute is arranged, can comprise a second force measuring device. This second force measuring device also comprises an autarkical voltage supply and further comprises a second transmitting unit so that the receiving device can also receive data relating to the state of the drogue parachute. If, for example because of a fault associated with opening, the tractive force provided by the drogue parachute is not sufficient to pull a main parachute out of the aircraft, for example if lines of the drogue parachute have become entangled or if the drogue parachute has some other defect, with this knowledge it would be possible to separate the drogue parachute prior to the actual deployment procedure from the load or from the main parachute.

According to one embodiment the receiving device is connected to an electronics unit that is designed to compare an acquired tractive force acting on a line with a predetermined maximum value of a tractive force, and to generate a warning signal if the aforesaid is exceeded. This is an additional step to increase the safety of such a system for deploying loads, because the predetermined maximum value practically represents the tolerable load of the aircraft, which load should not be exceeded for reasons of maintaining the flight characteristics. Such a predetermined maximum value should include a certain safety factor. The warning signal generated can be used on external devices, for example on a display unit or the like, for warning or notifying a pilot or some other crew member, or it can be further processed in additional devices that are described in some of the following embodiments.

In one embodiment the system comprises a display unit that is designed to be connected to the receiving unit. The display unit can represent the acquired tractive forces and can, for example also if a warning signal generated by the electronics unit is emitted, output a corresponding visual warning. The display unit could be designed as a display, a circular dial arrangement, a digital display or a warning light or a flashing light.

In one embodiment the receiving unit is further connected to an acoustic signaling device. If a warning signal generated by the electronics unit is present, for example an acoustic signal could be output within the aircraft so that crew members can immediately receive a corresponding warning without having to constantly keep an eye on a display unit for emitting a visual alarm. The acoustic signaling device could, for example, be designed in the form of a siren, a device with spoken sound output in a cockpit, or the like.

In one embodiment a mobile electronics device is provided by means of which the values determined in relation to the tractive force can be displayed or further processed in some other manner. To this effect the receiving device could already be integrated in such a mobile electronics device so that the mobile electronics device can directly receive the data or signals of the force measuring devices. As an alternative to this the electronics device could also be connected to a data network of the aircraft, by means of which data network it is possible to communicate with a receiving device that receives the data or signals of the force measuring devices.

As an alternative or in addition to this it is also possible for one or several stationary electronics devices to be present in the system according to the present disclosure, which electronics devices could be installed at a permanent location within the corresponding aircraft, for example at an exposed position within the fuselage of the aircraft and/or in a cockpit. In one embodiment the system comprises a device for detaching the aerial-delivery parachute line so that when a permissible tractive force is exceeded the aerial delivery parachute is automatically removed so that the flight characteristics of the aircraft can be normalized. To this effect an electronics unit could generate a warning signal when a predetermined maximum value of a tractive force is exceeded for a specified predetermined period of time. If such an emergency signal is present, a tow plate could cause detachment of the aerial delivery parachute. As an alternative to this, an emergency release device, through which the aerial-delivery parachute line has been fed, could cut the aerial-delivery parachute line in the manner of a guillotine.

In a likewise embodiment of the present disclosure the electronics unit is designed to transmit the warning signal to a flight control unit, for example a flight control computer, or the like, of the aircraft. At that location this warning signal could be used for intervention in the flight control system so that in the case of permanently excessive tractive force being exerted on the aerial-delivery parachute line the thrust of the aircraft is increased in order to be able to exclude any danger.

In addition, if the tractive force on the drogue parachute line is too low, opening the tow plate for releasing the aerial delivery parachute could be delayed until the drogue parachute has completely unfolded. If this is not possible over a certain period of time, i.e. if the expected tractive force of the drogue parachute is not achieved, the electronics unit could cause detachment of the drogue parachute.

As an additional option the first and/or the second force measuring device could comprise a storage unit that is designed to store all the received force values and if required carry out subsequent analysis of the deployment procedure, for example in order to achieve an improvement in the deployment procedure.

Furthermore, the first and/or the second force measuring device can additionally comprise a GPS receiver, wherein the location data provided by the aforesaid could be stored in the storage unit and/or could be sent out by way of the associated transmitting unit or an alternative transmitting unit in order to simplify locating a deployed load.

The autarkical energy supply to the force measuring devices is generally ensured by way of batteries or rechargeable batteries, wherein as a result of their substantial energy density and long service life lithium batteries appear to be particularly suitable. In this context it should also be ensured that the autarkical energy supply and/or the devices connected thereto are able to issue an acoustic and/or visual warning in the case of low residual capacity of the energy supply.

Furthermore, the present disclosure also provides a method for deploying loads out of an aircraft, which method comprises activating an aerial delivery parachute for placement in an enveloping flow past the aircraft; measuring a tractive force of an aerial-delivery parachute line; and transmitting the measured tractive force to a receiving device.

In one embodiment, after receiving the measured tractive force the latter is compared with a presented maximum value relating to a tractive force, and if the maximum value is exceeded a warning signal is generated. In a likewise embodiment, if a warning signal is present, an acoustic and/or visual warning is emitted.

In one embodiment, if a warning signal is present, an emergency release device can cut the line of the corresponding parachute or can influence the flight control system, for example by increasing the thrust.

Furthermore, the method according to the present disclosure can also comprise measuring a tractive force of a drogue parachute line of a drogue parachute and its transmission to the receiving device.

The present disclosure also provides an aerial delivery parachute-system comprising an aerial delivery parachute with an aerial-delivery parachute line and a first force measuring device. In addition, the aerial delivery parachute-system can also comprise a drogue parachute with a drogue parachute line and a second force measuring device.

Finally, the present disclosure also provides an aircraft with a closable opening and a system for deploying loads according to the preceding description.

A person skilled in the art can gather other characteristics and advantages of the disclosure from the following description of exemplary embodiments that refers to the attached drawings, wherein the described exemplary embodiments should not be interpreted in a restrictive sense.

BRIEF DESCRIPTION OF THE DRAWINGS

The various embodiments will hereinafter be described in conjunction with the following drawing figures, wherein like numerals denote like elements, and wherein.

DETAILED DESCRIPTION

The following detailed description is merely exemplary in nature and is not intended to limit the present disclosure or the application and uses of the present disclosure. Furthermore, there is no intention to be bound by any theory presented in the preceding background or the following detailed description.

Figure 1A:
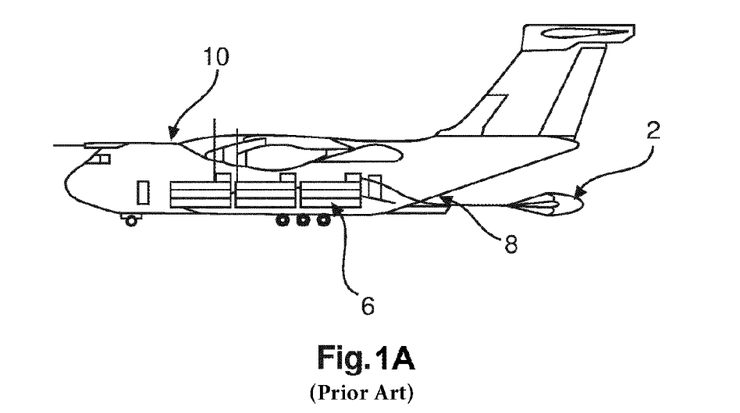
FIG. 1A to FIG. 1C show an aircraft out of which a load is deployed by means of an aerial delivery parachute.
Figure 1B:
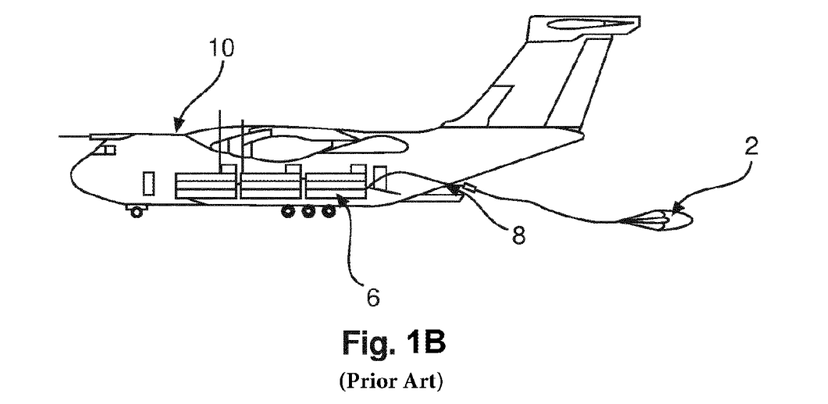
Figure 1C:
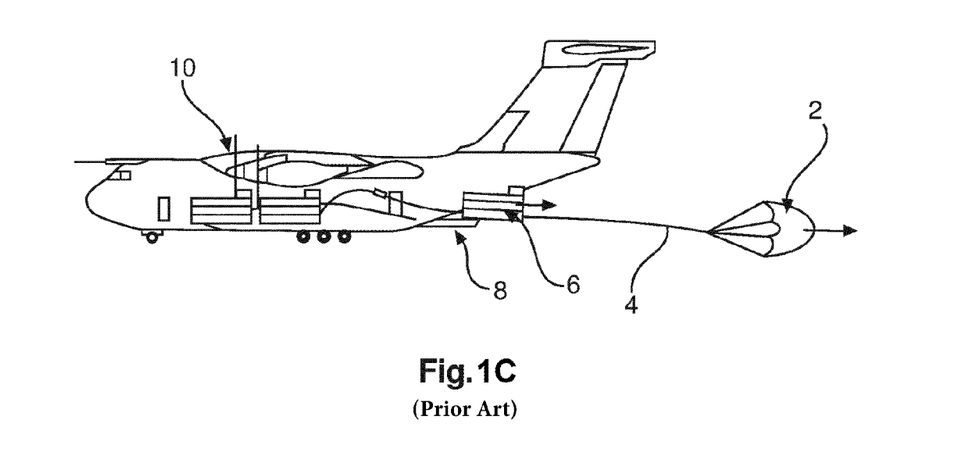

In FIGS. 1A to 1C the approximate chronological sequence of deploying a load out of an aircraft by means of an aerial delivery parachute 2 is shown. For this purpose the aerial delivery parachute 2 is connected to a load 6 by means of an aerial-delivery parachute line 4. FIG. 1A shows that the aerial delivery parachute 2 first needs to be conveyed out of an opening 8 of an aircraft 10 so that said aerial delivery parachute 2 inflates, and consequently the aerial-delivery parachute line 4 tensions, as shown in FIG. 1B, in order to in this manner pull the load 6 from the opening 8 of the aircraft 10, as shown in FIG. 1C, so that said load 6 finally descends in a gravity-driven manner towards the ground.

Figure 2A:
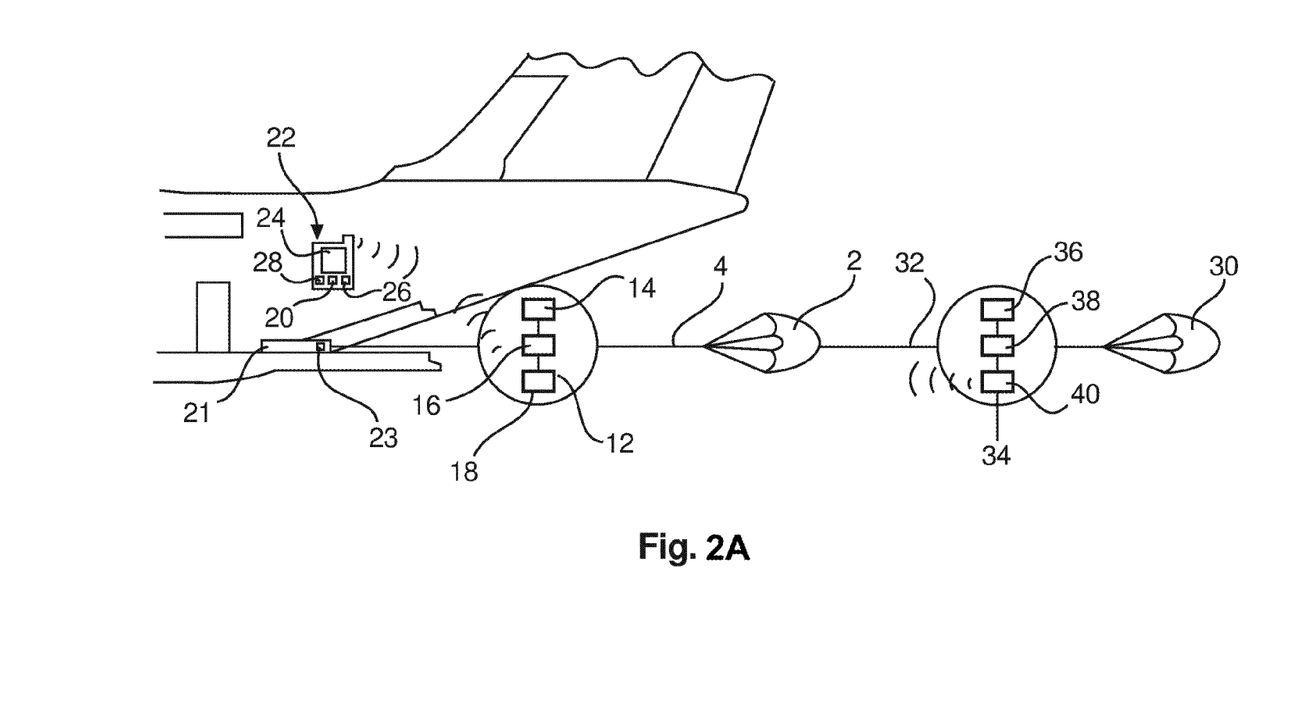
FIGS. 2A and 2B show a system according to the present disclosure for deploying loads out of an aircraft.
Figure 2B:
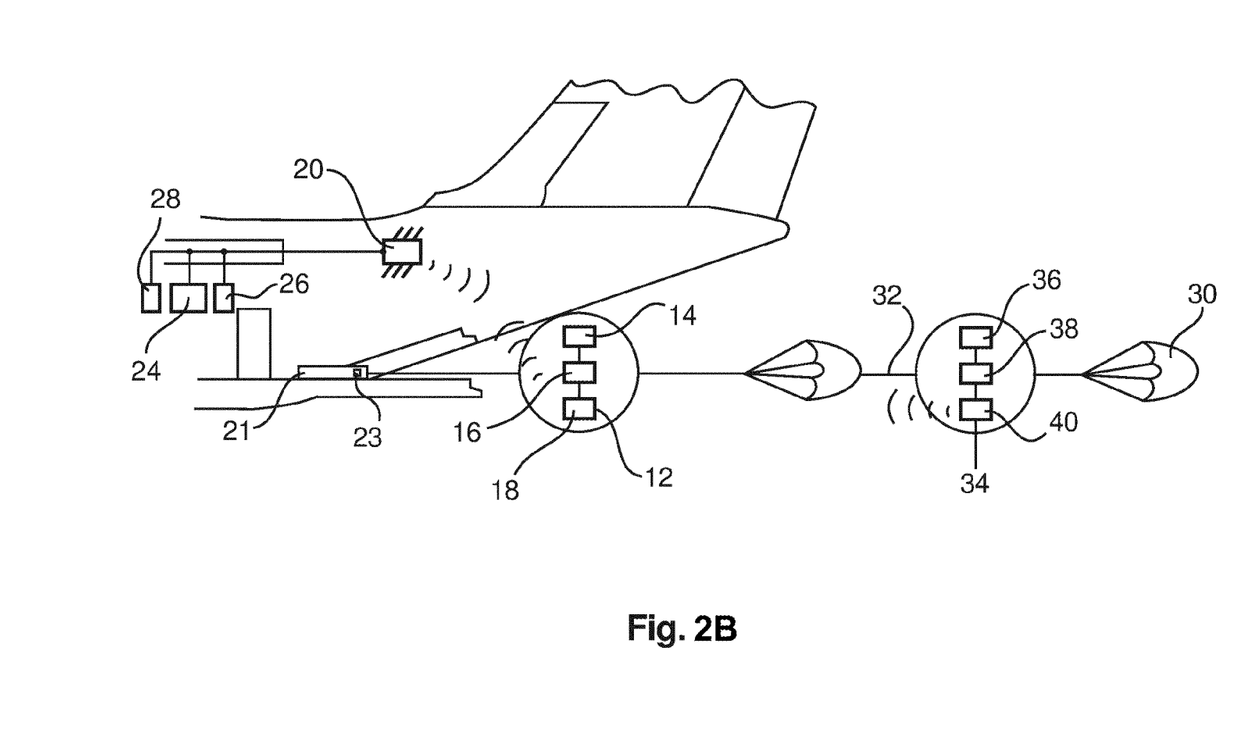

FIGS. 2A and 2B show an aerial delivery parachute 2 which is arranged on a tow plate 21 so as to be detachable by way of an aerial-delivery parachute line 4, wherein in a series connection a first force measuring device 12 is arranged on the aerial-delivery parachute line 4, which force measuring device 12 is designed to determine the tractive force of the aerial-delivery parachute line 4. Apart from the essential component of the force measuring sensor 14 the first force measuring device 12 comprises a first autarkical voltage supply 16 and a wireless first transmitting device 18, connected to the aforesaid, which transmitting device 18 is connected to a transmitting antenna (not shown in this diagram) in order to wirelessly transmit signals. Said transmitting antenna is designed to transmit determined tractive force values to a receiving device 20 located within the fuselage of the aircraft 10.

The receiving device 20 can be designed as a mobile receiving device 20, which can, for example, as shown in FIG. 2A, be situated within a mobile electronics device 22 that could be carried along by the aircrew so as not to be tied to stationary devices. FIG. 2B shows a stationary variant of a receiving device 20 that is permanently arranged in the aircraft 10.

For the purpose of displaying or signaling tractive force values the receiving device 20 is connected to a display unit 24 that in FIG. 2A is directly integrated in the mobile electronics device 22, while in FIG. 2B a stationary variant is shown.

The display unit 24 can be designed to display a determined tractive force. This could be implemented in the form of a tractive force value expressed in N or kN. As an alternative or in addition to this it would be sensible to indicate any instance of exceeding a predetermined maximum value of a tractive force. In order to determine any instance of exceeding a predetermined tractive force the receiving device 20 can generally be connected to an electronics unit 26 that can compare an actually determined tractive force with a predetermined maximum value. This electronics unit 26 can in turn be integrated in the mobile electronics device 22 (FIG. 2A) or can be arranged as a stationary variant (FIG. 2B) in the aircraft 10.

The variants shown in FIGS. 2A and 2B can also be combined, for example in order to significantly reduce the expenditure associated with the development of mobile electronics devices 22. In this context it might make sense for a stationary receiving device 20, as shown in FIG. 2B, to receive data from the first force measuring device 12, and to forward said data to an on-board data network, for example a wireless data network such as a WLAN or the like, so that commercially available mobile electronics devices supplemented by corresponding programming are already adequate to process and display the tractive force measured.

The display unit 24 can, furthermore, be arranged in a cockpit of the aircraft 10 so that a pilot can always obtain feedback as to whether a maximum tractive force has been exceeded or whether a tractive force associated with a fully inflated aerial delivery parachute 2 has been achieved at all. In this way, when required, actions can immediately be initiated by the pilot or by other crew members, which actions result in remedying incomplete activation of an aerial delivery parachute, or in detachment of a jammed load or a jammed aerial delivery parachute. For example, an emergency release device 23 could be integrated in or on the tow plate 23, through which emergency release device 23 the aerial-delivery parachute line 4 is guided, wherein said emergency release device 23 can cut said aerial-delivery parachute line 4 if required.

In one example, the receiving device 20 is connected to an acoustic signaling device 28, which for example signals any instance of exceeding a predetermined maximum value of a tractive force in such a manner that signaling is easily audible in the aircraft. Accordingly the crew need not permanently keep an eye on a display unit 24 or the like in order to be able to ensure correct functioning of the system.

In another embodiment, on the aerial delivery parachute 2 a drogue parachute 30 is arranged which comprises a drogue parachute line 32 on which a tractive force can be determined by means of a second force measuring device 34. The latter also comprises a force measuring sensor 36, a second autarkical voltage supply 38, and a wireless second transmitting device 40 that is designed to transmit signals or data to a receiving device 20.

The drogue parachute line 32 can also be detachably mounted to the tow plate 21 and can be cut by means of the emergency release device as soon as, by means of measuring the tractive force on the drogue parachute line 32, it is detected that the drogue parachute 30 cannot fully deploy.

Figure 3:
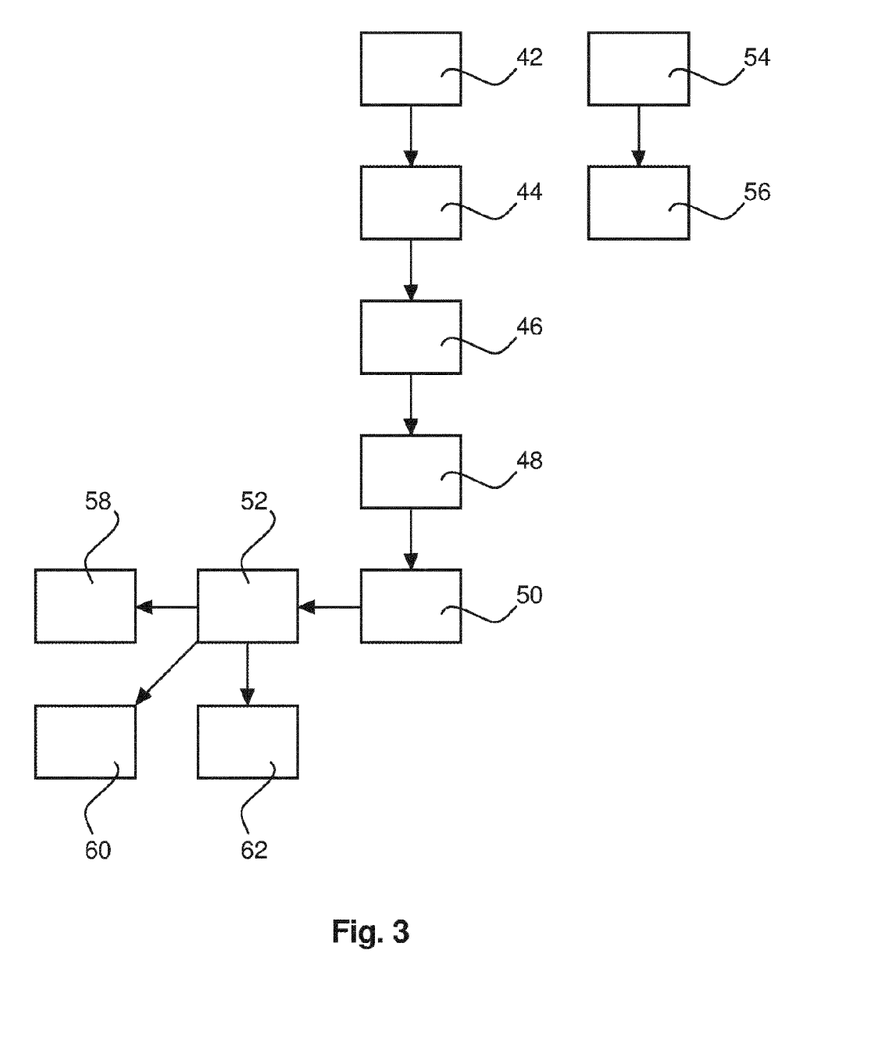
FIG. 3 shows a method according to the present disclosure for deploying loads out of an aircraft.

FIG. 3 in a diagrammatic block-based view shows the method according to the present disclosure. The method for deploying loads out of an aircraft comprises, as an example, activating an aerial delivery parachute 42; measuring 44 a tractive force of an aerial-delivery parachute line; and transmitting 46 the measured tractive force to a receiving device. Furthermore, the method according to the present disclosure can comprise comparing 48 the measured tractive force with a predetermined maximum value relating to a tractive force; and generating 50 a warning signal if the maximum value is exceeded. If a warning signal is present, an acoustic and/or visual warning signal can be generated 52.

At the same time the method according to the present disclosure can also comprise measuring a tractive force of a drogue parachute line 54 and transmitting 56 this measured tractive force to a receiving device.

If a warning signal is present, the corresponding line of a main parachute or a drogue parachute can be detached 58, signaling can be triggered 60, and/or intervening 62 in the flight control system can take place.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the present disclosure in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the present disclosure as set forth in the appended claims and their legal equivalents.

What is claimed is:

1. A system for deploying loads out of an aircraft, comprising:
   an aerial delivery parachute with an aerial-delivery parachute line;
   an activator configured to place the aerial delivery parachute in an enveloping flow past the aircraft;
   a receiving device located in a fuselage of the aircraft that is configured to wirelessly receive signals;
   a first force measuring device located outside the fuselage of the aircraft during a deployment process that is connected in series to the aerial-delivery parachute line to thereby measure a measured tractive force acting on the aerial-delivery parachute line; and
   a first autarkical voltage supply as well as a wireless first transmitting device that is connected to the first autarkical voltage supply and to the first force measuring device so that the first autarkical voltage supply, the wireless first transmitting device and the first force measuring device are all located outside the fuselage of the aircraft,
   wherein the first transmitting device is equipped to transmit to the receiving device signals representing the measured tractive force acting on the aerial-delivery parachute line to the receiving device located in the fuselage of the aircraft.

2. The system of claim 1, further comprising:
   a drogue parachute with a drogue parachute line; and
   a second force measuring device that is connected in series to the drogue parachute line to thereby acquire second measuring data representing a second measured tractive force acting on the drogue parachute line, and includes a second autarkical voltage supply and a wireless second transmitting device that is connected to the second autarkical voltage supply,
   wherein the second transmitting device is designed to transmit to the receiving device signals representing the acquired second measuring data and/or the data representing the acquired second measuring data from the second force measuring device.

3. The system of claim 1, wherein the receiving device is connected to an electronics unit that is designed to compare the measured tractive force acting on the aerial-delivery parachute line with a maximum value of the tractive force, and to generate a warning signal if the maximum value of the tractive force is exceeded.

4. The system of claim 1, further comprising a display unit that is designed to be connected to the receiving device and that is designed to display at least one of the measured tractive force and an instance of the measured tractive force exceeding a maximum value.

5. The system of claim 1, further comprising an acoustic signaling device that is designed to be connected to the receiving device and that is designed to signal any instance of exceeding a maximum value of the tractive force.

6. The system of claim 1, further comprising at least one mobile electronics device that is designed to display or further process the signals that are received by the receiving device.

7. The system of claim 1, further comprising an emergency release device through which the aerial-parachute delivery line is feedable, wherein the emergency release device is designed to cut the aerial-parachute delivery line.

8. The system of claim 1 wherein the activator is a tow plate.

9. The system of claim 1 further comprising an electronics unit coupled to receive the signals representing the measured tractive force acting on the aerial-delivery parachute line from the receiving device and to increase a thrust applied to the aircraft when the measured tractive force acting on the aerial-delivery parachute line exceeds a maximum value.

10. The system of claim 1 further comprising an electronics unit coupled to receive the signals representing the measured tractive force acting on the aerial-delivery parachute line from the receiving device and to detach the aerial-delivery parachute when the measured tractive force acting on the aerial-delivery parachute line exceeds a maximum value.

11. The system of claim 1 further comprising a storage unit coupled to receive the signals representing the measured tractive force acting on the aerial-delivery parachute line from the receiving device and to store the measured tractive force acting on the aerial-delivery parachute line for subsequent analysis.

12. The system of claim 11 further comprising a global positioning system (GPS) receiver configured to provide location data that is stored in the storage unit in conjunction with the signals representing the measured tractive force acting on the aerial-delivery parachute line.

13. An aircraft having a fuselage, the aircraft comprising:
a closeable opening; and
a system for deploying loads out of the opening, the system including:
an aerial delivery parachute with an aerial-delivery parachute line;
an activator configured to place the aerial delivery parachute in an enveloping flow past the aircraft;
a receiving device located in the fuselage of the aircraft configured to wirelessly receive signals representing acquired measuring data indicating a measured tractive force acting on the aerial-delivery parachute line;
a first force measuring device that is located outside of the fuselage of the aircraft during a deployment process and that is connected in series to the aerial-delivery parachute line to thereby acquire the measuring data representing the measured tractive force acting on the aerial-delivery parachute line; and
a first autarkical voltage supply as well as a wireless first transmitting device that is connected to the first autarkical voltage supply and to the first force measuring device so that the first autarkical voltage supply, the wireless first transmitting device and the first force measuring device are all located outside the fuselage of the aircraft,
wherein the first transmitting device is equipped to transmit to the receiving device the signals representing the measured tractive force acting on the aerial-delivery parachute line to the receiving device located in the fuselage of the aircraft.

14. The aircraft of claim 13, further comprising:
a drogue parachute with a drogue parachute line; and
a second force measuring device that is connected in series to the drogue parachute line to thereby acquire second measuring data representing a second tractive force acting on the drogue parachute line, and includes a second autarkical voltage supply and a wireless second transmitting device that is connected to the second autarkical voltage supply,
wherein the second transmitting device is designed to transmit to the receiving device signals representing the acquired second measuring data from the second force measuring device.

15. The aircraft of claim 13, wherein the receiving device is connected to an electronics unit that is designed to compare the measured tractive force acting on the aerial-delivery parachute line with a maximum value of the tractive force, and to generate a warning signal if the maximum value of the tractive force is exceeded.

16. The aircraft of claim 13, further comprising a display unit that is designed to be connected to the receiving device and that is designed to display at least one of a determined value of the tractive force and an instance of the tractive force exceeding a maximum value.

17. The aircraft of claim 13, further comprising an acoustic signaling device that is designed to be connected to the receiving device and that is designed to signal an instance of exceeding a maximum value of the tractive force.

18. The aircraft of claim 13, further comprising at least one mobile electronics device that is designed to display or further process the signals received by the receiving device.

19. The aircraft of claim 13, further comprising an emergency release device through which the aerial-parachute delivery line is feedable, wherein the emergency release device is designed to cut the aerial-parachute delivery line.

20. The aircraft of claim 13 wherein the activator is a tow plate.

* * * * *